D. C. BROWN.
FERTILIZER DISTRIBUTOR.

No. 180,536. Patented Aug. 1, 1876.

WITNESSES:
H. Prydquist.
John Goethals

INVENTOR:
D. C. Brown
BY
Munn
ATTORNEYS.

UNITED STATES PATENT OFFICE.

DAVID C. BROWN, OF LOG TOWN, LOUISIANA.

IMPROVEMENT IN FERTILIZER-DISTRIBUTERS.

Specification forming part of Letters Patent No. 180,536, dated August 1, 1876; application filed July 1, 1876.

*To all whom it may concern:*

Figure 1:
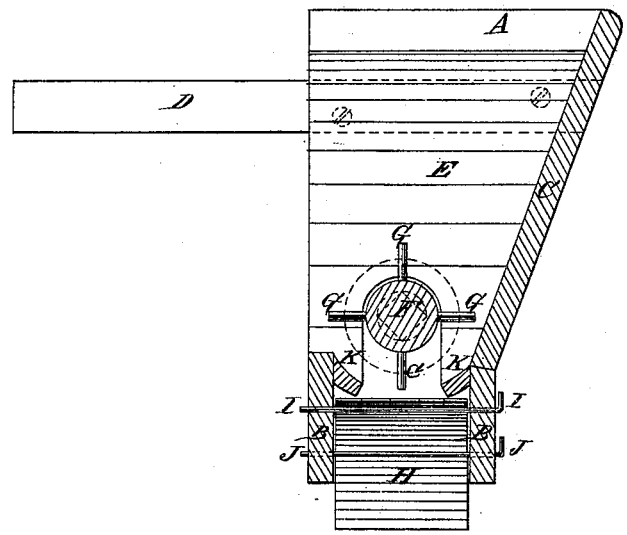
Figure 2:
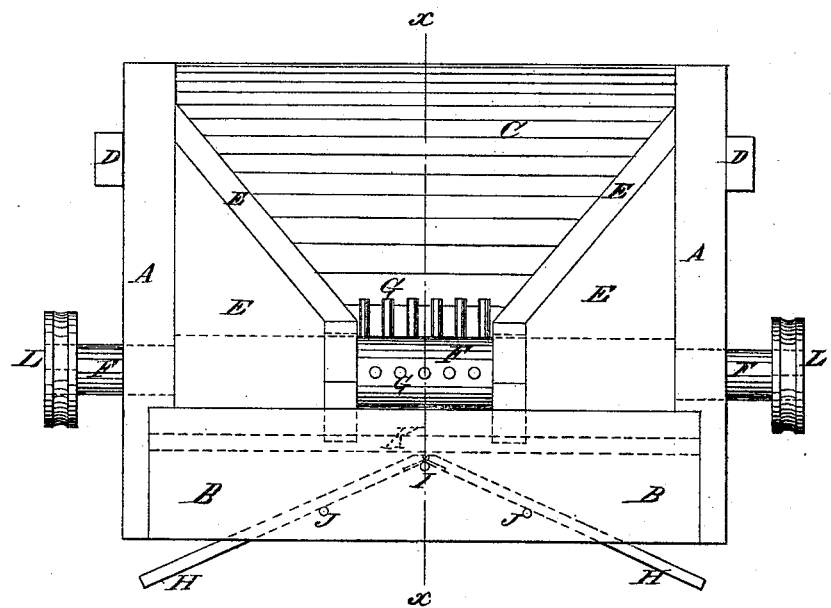

Be it known that I, DAVID C. BROWN, of Log Town, in the parish of Ouachita and State of Louisiana, have invented a new and useful Improvement in Fertilizer-Distributer, of which the following is a specification:

Figure 1 is a vertical section of my improved device taken through the line $x\,x$, Fig. 2. Fig. 2 is a front view of the same.

Similar letters of reference indicate corresponding parts.

The object of this invention is to furnish an improved device for attachment to the rear end of a wagon-body for distributing cotton-seed as a fertilizer, which may be used for distributing other fertilizers, and which will enable the fertilizer to be placed wherever desired.

The invention consists in the half-hopper, provided with the bars; the shaft, provided with the radial pins and the pulleys, and the inclined boards, hinged together and supported adjustably by the pins, constructed and combined with each other to adapt the device to be attached to the rear end of a wagon-body, as hereinafter described.

A are the sides of the device, which are vertical, and to the front and rear edges of the lower ends of which are attached the ends of the base-boards B. The boards B are made of a length equal to the width of the wagon-body. The rear edges of the side-boards A are inclined, and to them is attached the flaring rear-board C. To the sides A are attached the rear parts of the bars D, the forward parts of which are designed to be bolted to the side-boards of the wagon-body.

The side parts of the box are filled up with boards E, giving its interior the shape of a half-hopper. In the lower parts of the sides A revolves a shaft, F, to the middle part of which, between the lower ends of the inclined sides E, are attached radial pins G, by which the fertilizer is fed out. The fertilizer falls upon the inclined boards H, by which it is guided to the desired places.

The inner ends of the inclined boards H are hinged to each other, and are supported by a pin, I, passed through the base-boards B. The outer ends of the boards H are supported at any desired inclination to drop the fertilizer at any desired distance apart by two pins, J, passed through the said base-boards B. To the inner edges of the base-boards B, between the lower ends of the boards E, are attached narrow guide-boards K, which are curved upon the arc of the circle described by the outer ends of the pins G. To the projecting ends of the shaft F are attached wheels or pulleys L, to receive belts or chains, which also pass around wheels or pulleys attached to the inner sides of the hind wheels of the wagon, which belts should be crossed so that the shaft F may turn in the opposite direction from the wagon-wheels.

In using the device, a man is placed in the wagon to keep the hopper filled with the fertilizer. The amount of fertilizer distributed may be regulated by increasing or diminishing the number of pins G, and by varying the relative size of the driving-pulleys.

Having thus described my invention, I claim as new and desire to secure by Letters Patent—

The half-hopper A B C E, provided with the bars D; the shaft F, provided with the radial pins G, and the pulleys L, and the inclined boards H, hinged together and supported adjustably by the pins I J, constructed and combined with each other, substantially as herein shown and described, to adapt the device to be attached to the rear end of a wagon-body, as set forth.

DAVID C. BROWN.

Witnesses:
WILLIAM R. HARDY,
FRANCIS A. HALL.